United States Patent [19]

Satomi et al.

[11] Patent Number: 4,947,542

[45] Date of Patent: * Aug. 14, 1990

[54] METHOD OF MAKING A CRYSTALLIZED GLASS-BONDED AMORPHOUS METAL MAGNETIC FILM-NON-MAGNETIC SUBSTRATE MAGNETIC HEAD

[75] Inventors: Mitsuo Satomi, Katano; Nobuyuki Kaminaka, Neyagawa, both of Japan

[73] Assignee: Matsushita Electric Industrial Co., Ltd., Kadoma, Japan

[ * ] Notice: The portion of the term of this patent subsequent to Jul. 18, 2006 has been disclaimed.

[21] Appl. No.: 348,598

[22] Filed: May 5, 1989

Related U.S. Application Data

[63] Continuation of Ser. No. 212,141, Jun. 13, 1988, Pat. No. 4,847,983, which is a continuation of Ser. No. 848,829, Apr. 7, 1986, abandoned.

[30] Foreign Application Priority Data

Apr. 8, 1985 [JP] Japan .................................. 60-73877

[51] Int. Cl.$^5$ .............................................. G11B 5/42
[52] U.S. Cl. .......................................... 29/603; 65/43; 360/127
[58] Field of Search .............................. 29/603; 65/43; 360/125–127, 110, 119, 120, 122, 123

[56] References Cited

U.S. PATENT DOCUMENTS

| | | |
|---|---|---|
| 3,577,634 | 5/1971 | Secrist . |
| 3,615,758 | 10/1971 | McMillan . |
| 3,639,701 | 2/1972 | Secrist et al. . |
| 4,422,117 | 12/1983 | Nomura et al. . |
| 4,602,307 | 7/1986 | Torin et al. . |

FOREIGN PATENT DOCUMENTS

| | | |
|---|---|---|
| 0106321 | 4/1984 | European Pat. Off. . |
| 2099132 | 3/1972 | France . |
| 55-108922 | 8/1980 | Japan . |
| 0179926 | 11/1982 | Japan . |
| 0107910 | 1/1983 | Japan . |
| 0170008 | 9/1985 | Japan . |
| 0187908 | 9/1985 | Japan . |
| 0853661 | 8/1981 | U.S.S.R. . |
| 84/03167 | 8/1984 | World Int. Prop. O. . |

*Primary Examiner*—Carl E. Hall
*Attorney, Agent, or Firm*—Cushman, Darby & Cushman

[57] ABSTRACT

A magnetic head having head core constituted by a sandwiched magnetic material on both side thereof by a substrate materials such as, and the magnetic material and the substrate materials are bonded by crystallized glass containing crystals such as gahnite, willemite or the like.

1 Claim, 4 Drawing Sheets

METHOD OF MAKING A CRYSTALLIZED GLASS-BONDED AMORPHOUS METAL MAGNETIC FILM-NON-MAGNETIC SUBSTRATE MAGNETIC HEAD

This is a continuation of application Ser. No. 07/212,141, filed June 13, 1988 (now U.S. Pat. No. 4,847,983, issued July 18, 1989), which was a continuation of application Ser. No. 06/848,829, filed Apr. 7, 1986 (abandoned).

BACKGROUND OF THE INVENTION

1. Field of the Invention

The present invention relates to a magnetic head, and especially a magnetic head having magnetic material sandwiched on both side thereof by substrate material.

2. Description of the Prior Art

Ferrite is conventionally used as a material for the magnetic head core, because it has superior practicality and resistance to wear, but its saturation magnetization is lower by 30–50% than that of alloy materials. The saturation magnetization of the material which comprises the head core becomes a problem when ferrite is used for the head core for use with media for high density (high coercive force) recording which has appeared in recent years; a sendust or an amorphous alloy is used as the material for the core.

Amorphous alloy for magnetic head use is in the limelight because it has superior resistance to wear and superior magnetic characteristics. The amorphous alloy is suitable for making thin films less than 50 $\mu$m thick because of its manufacturing characteristics. And also, metal such as an amorphous alloy has much smaller specific resistance than that of ferrite. The eddy current loss of the metal in the high frequency region is larger than that of ferrite, so that an amorphous alloy is convenient. Such thin sheet films, however, are not easily machined and are not very strong. Accordingly, a magnetic head having a thin film sandwiched on both sides thereof by a substrate material having superior resistance to wear is in ordinary practical use. Here, however, the bonding of magnetic material to the substrate material is likely to be problematic. Organic adhesives are easy to handle, and easy to heat for hardening, but they must have a minimum thickness for practical use of, for example, several tens of microns. Furthermore, these organic adhesives have poor reliability when subjected to changes in temperature and humidity after the bonding, so that it is difficult to maintain the narrow gap length of the magnetic head, which is used for a video tape recorder and the like.

The most reliable bonding is the bonding by melted glass.

FIGS. 2 shows the relationship between magnetization $\sigma$ and temperature T. As shown in FIG. 2, generally the magnetization becomes negligible at Curie temperature Tc. And the magnetization increases near crystallization temperature Tx because the crystalline alloy exhibits the magnetic characteristics again.

When the magnetic characteristic of magnetic material is considered for use in a magnetic head, a higher magnetic permeability is desirable. It is necessary to reduce the anisotropy of the magnetic film so as to gain the high magnetic permeability. Accordingly, the maganetic film must be heat treated in a temperature region which is higher than Tc and lower than Tx, to reduce the taking off the anisotropy of the magnetic film.

On the other hand, there are materials wherein the order of Tc into Tx is inversed, and such materials can not have high magnetic permeability by the normal heat treatment. A special heat treatment such as heat treatment in magnetic field is necessary to gain high magnetic permeability. But such special heat treatment is a problem to practice, and so the amorphous alloy shown in FIG. 2 is normally used for a magnetic head.

When considering the manufacturing process of the magnetic head which uses amorphous alloy bonded by melted glass, at least two steps of heat treatment, namely heat treatment process for bonding substrate material and amorphous alloy, and heat treatment process for making the gap, are necessary. When considering the looseness and the movement of the glass, it is necessary to use a glass having a high softening temperature for bonding the substrate and amorphous alloy and to use a glass having a low softening temperature for making the gap, is ideal. On the other hand, when considering the reduction of anisotropy of the magnetic film, the temperature of final heat treatment process of manufacturing of the magnetic head is necessary to be selected at least the same as or more than that of the heat treatment processes made before that.

Generally, the crystallization temperature Tx is generally about 500° C., and the Curie temperature Tc is above 450° C. when considering the magnetic flux density as the magnetic head material, in practice. Accordingly, when considering materials, at present the only one which has a narrow temperature region between Tc and Tx and a working temperature lower than Tx is lead glass. In order to decrease the softening temperature of the glass, the content of lead in the glass may be increased. However, the glass becomes unstable due to the increase in the content of lead, its; change mechanical strength becomes weak. Therefore, it is impossible to decrease the softening temperature.

From the above-mentioned point of view, glasses having softening temperatures above 400°–500° C. are used for the low melting point glass. The glass for bonding the substrate is the same as that used to make the gap. Even when glasses of different melting points are properly used for bonding the substrate and making the gap, the substrate-bonding glass layers may become loose during the gap making process because the temperature used in the gap making process is close to their softening temperatures. Therefore, problems are created, such as low accuracy of gap length, core slippage and decrease of yield. FIG. 1 schematically shows the looseness of glass layers and the like magnified. In actuality they are in the order of micron displacements. In FIG. 1, substrate 1 is bonded to magnetic material 2 by melted glass layer 3, and gap 4 is firmly maintained. Crevice 5 is, however, brought about by the looseness of the melted glass layer 3.

On the other hand, there is prior art wherein crystallized glass is applied to a gap part of a magnetic head (which is shown in Japanese patent unexamined publication Sho No. 55-108922). In this prior art, however, the glass composition obtained by sputtering method may be shifted from its original composition and sufficient bonding hardness can not be assured on rough surfaces, except for the gap surface, because of the thinness of the glass film layer.

SUMMARY OF THE INVENTION

Conventional glass bonded magnetic heads have many problems such as, loosening of the glass layer during gap making, discrepancy of the core alignment, insufficient manufacture yield, low accuracy of gap length, decreased of the output level of magnetic head because of the adherence of the magnetic powder from the magnetic tape in the crevice of the glass substrate, and the like.

The object of the present invention is to prevent such problems associated with conventional magnetic heads and to prepare the improved magnetic head by bonding the magnetic material and the substrate material by crystallized glass.

These and other objects of the present invention are achieved by a magnetic head having an amorphous magnetic film sandwiched by a pair of non-magnetic substrate materials.

The amorphous magnetic film and at least one of the non-magnetic substrate materials are bonded by a crystallized glass layer which, in amorphous state, has a softening temperature lower than the crystallizing temperature of said amorphous magnetic film, and in crystallized state has a melting temperature higher by about 100° C. and said softening temperature.

DESCRIPTION OF THE PREFERRED EMBODIMENTS

A preferred embodiment of a magnetic head in accordance with the present invention is described with reference to the manufacturing process shown in FIG. 3(A), FIG. 3(B), FIG. 3(C), FIG. 3(D) and FIG. 3(E).

Figure 3A:
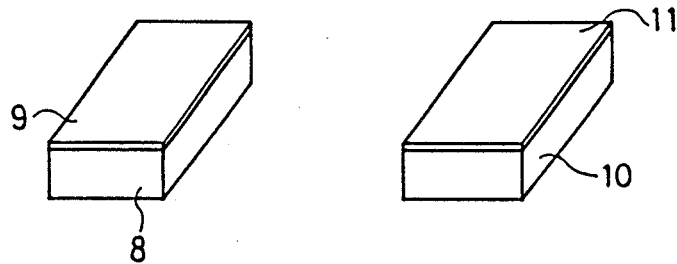
FIG. 3(A), FIG. 3(B), FIG. 3(C), FIG. 3(D) and FIG. 3(E) are perspective views of preferred embodiments of the manufacturing process of a magnetic head in accordance with the present invention.

As shown in FIG. 3(A), an amorphous alloy film 9 which is a soft magnetic metal film is formed on the mirror of the finished substrate surface. Substrate surface 8 is comprised of a high melting point glass on the market, by a sputtering type thin film manufacturing apparatus. A bonding glass layer 11 for bonding, (which is a glass crystallizable glass in amorphous state containing such as PbO 62%, ZnO 24%, $B_2O_3$ 8%, $SiO_2$ 5% and $Al_2O_3$ 1% of component ratio, respectively), is bonded the on surface of the opposit substrate material 10. A range of 0.1–10 μm is suitable for the thickness of the bonding layer. When considering the warp, bend or flatness of substrate materials, the thickness should be at least 0.1 μm. It is difficult to attain uniformity of thickness of the bonding glass layer in operation because the thickness of the substrate is over 10 μm. And because of the use of a substrate material having superior resistance to wear, undesirable offset wear on the tape running surface may take place while the tape is run due to the difference of resistances to wear of the bonding glass layer and the substrate substance. In this case, the powder of crustalizable glass (such as frit in amorphous state having 450° C. of softening temperature) is used as the glass material, and fine-grains of the crystallizable glass (for example, the diameter of the grain is smaller than 1 μm) are spread in a predetermined thickness. It is then baked for a few minuites at a relatively low temperature (480° C.), wherein the glass can not be crystallized. The bonding glass layer 11 is amorphous after the baking process. Sputtering and vapor deposition are suitable for adhering the bonding glass 11, but they have some problems such as the change of the characteristics of the glass caused by the discrepancy made between the target component and that of the film. It is necessary to adjust for the discrepancy, and much time is wasted due to the slow film forming speed used for a film of thickness of 1 μm.

Accordingly, the present invention adopted the spread and bake method. The metal film 9 obtained had a saturation magnetization of Bs=8,000 Gauss, a crystallization temperature of Tx=560° C., and a Curie temperature Tc=450° C.

Figure 3B:
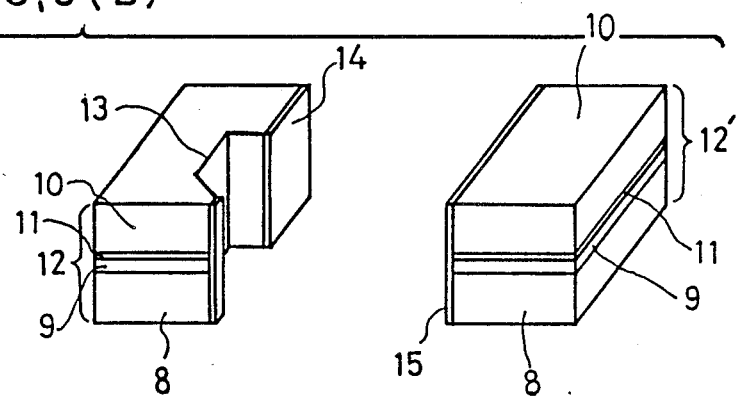

After that, as shown in FIG. 3B, the substrate material 10 is put upon the substrate material 8 so that the amorphous alloy film 9 faces the glass layer 11, and then they are bonded by heating at 490° C. to make core blocks 12 and 12'. In this process, the bonding glass layer 11 is heated over its softening temperature. Since such glass is easily bonded to amorphous metal alloy film, the bonding glass is crystallized by heating the bonded glass under the temperature of 490° C. for a predetermined time. The crystallized bonding glass layer 11 has a softening temperature (as it is crystal, the softening temperature is melting point) raised by about 100° C., so at a temperature of 490° C., the characteristics of the glass may not be loosened.

Figure 3C:
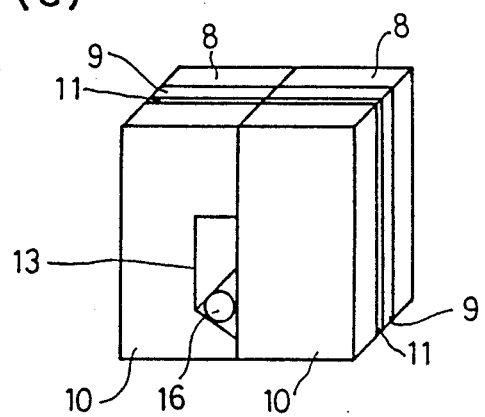
Figure 3D:
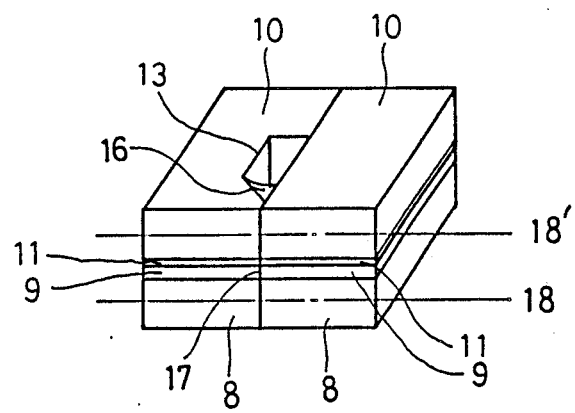
Figure 3E:
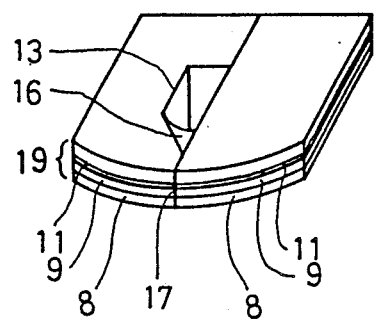

Then a coil window 13 is formed on one of such core blocks 12 or 12'. A gap spacer film 14 and a bonding glass film 15 are formed on necessary parts of the core blocks 12 and 12' by using a thin film manufacturing technique such asd sputtering or the like. As shown in FIG. 3C, such core blocks 12 and 12' are bonded by heating, in a manner so that the above-mentioned gap spacer film 14 is made to face glass film 15. In this case, a bonding glass 16 on the top of the coil window 13 is melted down under the temperature of 490° C. at the same time (gap forming process). In this process, the bonding of the core block 12 and 12' is made principally by the bonding glass 16, and the work of the bonding glass film 15 is auxiliary. Therefore, the use of an amorphous glass as the bonding glass film 15 is sufficient, and a crystallizable glass is not particularly necessary. And amorphous glass having a softening temperature of 400° C. is used as the bonding glass. As mentioned above, a gap 17 which is necessary for the magnetic head is formed, as shown in FIG. 3(D). And by cutting the core blocks to prescribed core thickness along the cutting line 18 and 18', and by forming a tape running surface 19, the head chip is completed, as shown in FIG. 3(D) and FIG. 3(E).

Table 1 shows the total manufacturing yield of the magnetic head manufactured by the above-mentioned process. The total yield of magnetic heads using conventional amorphous glasses (which have softening temperatures of 450° C. and 490° C. respectively) for bonding glass layer 11 are shown in Table 1 at the same time. In every case, the temperature of making core blocks 12 and 12' and the temperature of gap forming are respectively equal.

TABLE 1

| | Yield of magnetic head manufacturing | |
|---|---|---|
| In the present invention | Using conventional amorphous glass having softening temperature of | |
| | 450° C. | 490° C. |
| 99% | 53% | 35% |

As shown in Table 1, by using the present invention, the total manufacturing yield of magnetic heads was progressively increased. The low of total yield of magnetic heads using conventional amorphous glass was caused mainly by insufficiency of bonding due to the loosening of the glass during gap forming because of the softening temperature of 450° C., and by the peeling off of the substrate 8 and 10 due to bonding inperfection because of the softening temperature of 490° C.

Figure 4:
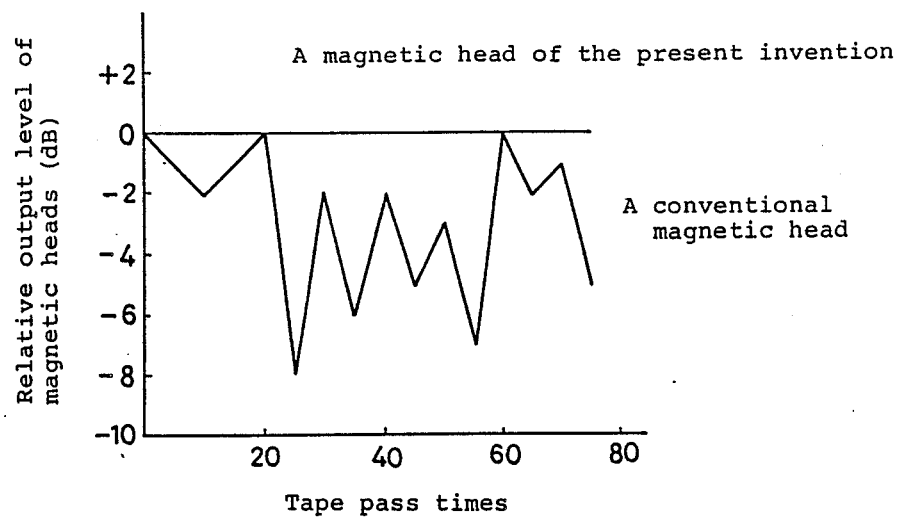
FIG. 4 shows the characteristic curves of the output levels of a conventional magnetic head and a magnetic head in accordance with the present invention.

FIG. 4 shows characteristic curves of the change of the output levels of the conventional magnetic head and of the magnetic head in accordance with the present invention versus tape pass times. The output level of the magnetic head in accordance with the present invention does not change even after many tape pass time, but the conventional magnetic head (wherein the bonding glass layer has a softening temperature of 450° C.) because of the looseness of bonding glass layer as mentioned above, a crevice betweeen the amorphous alloy film 9 and the substrate 10 was produced, and magnetic powder from the tape adheres on the crevice. Therefore the output of magnetic head decreases as a result of the spacing loss caused by such adherence. The degree of ahering of magnetic powder from the tape changes in reponse to the tape pass times, so that the output of magnetic head also changes in proportion to the tap pass times.

Figure 1:
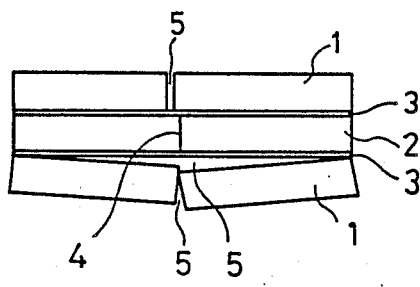
FIG. 1 is the schematic view of the front of the conventional magnetic head showing the tape running surface.
Figure 2:
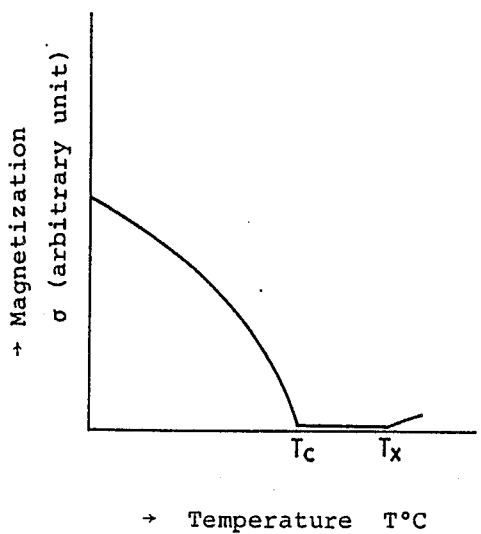
FIG. 2 shows a characteristic curve of the relationship between the magnetization and the temperature of an amorphous alloy.

As mentioned above, an embodiment using a sputtering method for forming the amorphous alloy film has been described. The method for forming amorphous alloy film is not limited to sputtering, but can be formed by vapor deposition method, or the like. Furthermore, such amorphous alloy film can be replaced by a ribbon type amorphous alloy made by a melt quenching method. In this case, the constitution of magnetic head is that of a pair of bonding glass layers disposed on both sides of the magnetic material of the ribbon type amorphous alloy. The pair of bonding glass layers correspond to the part 3 in FIG. 1 and the ribbon type amorphous alloy corresponds to the part 2 in FIG. 1.

For the amorphous alloy film, amorphous magnetic metal films composed of metal-metal systems such as Co-M (where M is a metal element such as Nb, Ti, Ta, Zr, W or the like) or Co-$M_1$-$M_2$ ($M_1$, $M_2$ are the metal element mentioned above), are preferrable because of their high magnetic pearmeability and their superior resistance to wear and high crystallization temperature. However, amorphous magnetic metal films composed of metal-metalloid systems such as Co-Fe-Si-B or Ni-Si-B which are containing elements of Si, B, C, P or the like, are also available if the films are sandwiched with the substrate of the present invention.

Stability of the glass bonding is enhanced by the increase in hardness and the rising of the softening temperature of the glass which is caused by crystallization of the original glass.

The characteristics of the crystallized glass are mainly fixed by the variation of the precipitated crystal, so that components and temperature of heat treatment are decided so as to obtain a desirable crystal for the use for crystalized glass.

Some crystals actually usable for crystallized glass are β-eucryptite ($Li_2O-A;_2O_3.2SiO_2$), β-spodumene ($Li_2O.Al_2O_3.4SiO_2$), quartz ($SiO_2$), lithium metasilicate ($Li_2O.SiO_2$), lithium distilicate ($Li_2O.2SiO_2$), rutile ($TiO_2$), corodierite ($2MgO.2Al_2O_3.5SiO_2$), gahnite ($ZnO.Al_2O_3$), willemite ($2ZnO.SiO_2$), fluorine-contained phlogopite {$(NaMg_3(Si_3AlO_{10})F_2$}, and the like. Accordingly, the components of the crystallized galss may be selected by considering the characteristics of these crystals.

As mentioned above, the present embodiment is described by using the amorphous alloy film of a single layer structure, but use of a laminated type core, wherein magnetic material and insulating material are alternately laminated, is superior because it prevents eddy current loss. The present invention can be used with another magnetic metal film such as sendust alloy or the like.

As a result of the bonding of the magnetic material and the substrate material by crystallized glass the bonding of such magnetic material and the substrate becomes stable, and loosening of the bonding glass layer does not occur during the gap making step. Furthermore, the total yield of the magnetic head in the manufacuring process can be progressively improved, and the output of the magnetic head can be stable because of elimination of the adhering of magnetic powder on the tape during the tape running.

The above-mentioned embodiment is described as an amorphous magnetic film is formed on one of non-magnetic substrate material, however, it is needless to say that a pair of amorphous magnetic films respectively formed on a pair of non-magnetic substrate materials also apply to the present invention.

What is claimed is:

1. A method for forming a magnetic head, comprising:
   (a) providing a first non-magnetic substrate layer having two opposite faces;
   (b) bonding onto one face of said first non-magnetic substrate layer an amorphous metallic magnetic film layer having an uncovered face;
   (c) providing a second non-megnetic substrate layer having two opposite faces;
   (d) bonding onto one face of said second non-magnetic substrate layer a layer of crystallizable glass in an amorphous state, said layer of crystallizable glass having a thickness of 0.1 to 10 μm and an uncovered face;
   said amorphous metallic magnetic film layer having an elevated crystallizing temperature;
   said crystallizable glass layer having an elevated softening temperature which is lower than said crystallizing temperature of said amorphous metallic magnetic film layer;
   said crystallizable glass layer being made of a glass which, when in a crystallized state, has a melting point which is higher than said softening temperature;
   (e) facially confronting said uncovered face of said amorphous metallic magnetic film layer with said uncovered face of said crystallizable glass layer, thereby covering said uncovered faces and providing a sandwich arrangement having at least four layers;

(f) baking said sandwich arrangement at a temperature below the crystallizing temperature of said amorphous metallic magnetic film layer, but sufficiently elevated as to cause crystallization of said crystallizable glass layer, thereby bonding said amorphous metallic magnetic film layer to said second non-magnetic substrate layer with a layer of crystallized glass;

(g) dividing said sandwich arrangement into at least two core blocks each comprising said at least four layers, disposed in a respective layer-to-layer connected sandwich arrangement, each layer having two opposite faces and an outer peripheral edge, a length and width extending generally parallel to said faces thereof, and a thickness extending generally perpendicular to said faces thereof;

one of said two core blocks being provided in an outer edge portion thereof with a coil window;

(h) providing said one core block edgewise in two portions thereof located oppositely perimetrically adjacent said coil window with one of a layer of gap spacer film and a layer of bonding glass film;

(i) providing the other of said two core blocks edgewise in at least one portion thereof spatially corresponding to said two portions on said one core block with the other of a layer of said gap spacer film and said layer of bonding glass film;

(j) placing said two core blocks in edge to edge confrontation with said layer of gap spacer film confronting said layer of bonding glass film;

(k) heating said two core blocks to a temperature not substantially higher than the baking temperature used in step (f), thereby bonding said two core blocks together at least partially by means of said bonding glass film into a composite block, with said gap spacer film providing a gap between respective edge portions of said amorphous metallic magnetic film layer of said two core blocks; and (l) profiling an edge of said composite block, including an intersection of said gap therewith to provide a tape running surface on which are exposed a series of at least four connected layers including a first non-magnetic substrate layer, an amorphous metallic magnetic film layer, a crystallized glass layer and a second non-magnetic substrate layer.

* * * * *